United States Patent
Baldinger

[15] 3,666,944
[45] May 30, 1972

[54] MEANS AND TECHNIQUE FOR MAKING RADIOGRAPHIC EXAMINATIONS

[72] Inventor: Charles P. Baldinger, Renton, Wash.
[73] Assignee: The Boeing Company, Seattle, Wash.
[22] Filed: May 11, 1970
[21] Appl. No.: 36,164

[52] U.S. Cl. ...................... 250/65 R, 250/105, 250/106 R, 250/108 R
[51] Int. Cl. ...................................................... G03b 41/16
[58] Field of Search .................. 250/65 R, 53, 106 R, 108 R

[56] References Cited

UNITED STATES PATENTS 3,237,009  2/1966  Warman ................................. 250/65
3,418,475  12/1968  Hudgens ............................... 250/108

Primary Examiner—James W. Lawrence
Assistant Examiner—C. E. Church
Attorney—Christensen & Sanborn

[57] ABSTRACT

A means and technique are disclosed for making a radiographic examination of a body at any or all points about the periphery thereof. According to the technique, a nuclear radiation source is enclosed in a recording device which is adapted to shield the source against the escape of radiation therefrom, but which has a recess in the exterior thereof across which the radiation can travel in a path confined within the device. The body is inserted into the recess so that a portion of the same is exposed to the radiation thereacross, while a section of a recording film which is sensitive to the radiation is arranged in the recess on the opposite side of the body from the source to record the character of the portion thereon. Thereafter, the body, the source, and the film are shifted in relation to one another so as to expose a different portion of the body to the path of radiation while another section of the film is arranged in the recess on the opposite side of the body from the source. Moreover, during the shifting process, radiation shielding is interposed in the path of radiation between the source and the recess so that the character of each portion of the body is separately recorded on a different section of the film.

6 Claims, 7 Drawing Figures

INVENTOR.
CHARLES P. BALDINGER
BY Christensen, Sanborn
& Matthews
ATTORNEYS

Patented May 30, 1972

INVENTOR.
CHARLES P. BALDINGER

BY Christensen, Sanborn
& Matthews
ATTORNEYS

INVENTOR.
CHARLES P. BALDINGER
BY Christensen, Sanborn & Matthews
ATTORNEYS 3,666,944

1

MEANS AND TECHNIQUE FOR MAKING RADIOGRAPHIC EXAMINATIONS

FIELD OF THE INVENTION

This invention relates to radiographic examinations, and in particular to a means and technique for making a radiographic examination of a body at any or all points about the periphery thereof.

OBJECTS OF THE INVENTION

One object of the invention is to provide a means and technique whereby radiographic examinations can be conducted with respect to bodies that are fixed in position in crowded and/or highly inaccessible locations, such as the interior of the wings or fuselage of an airplane. Another object is to provide a means and technique of this nature whereby the operator conducting the radiographic examination can do so without interrupting the activities of other personnel within the area, and without jeopardizing the safety of anyone nearby, even those within three feet of the body under examination. A further object, however, is to provide a means and technique of this nature whereby the device with which the examination is conducted can be remotely operated and advanced from one point to the next as each portion of the body is recorded. Other objects include the provision of a means and technique of this nature wherein the device for conducting the examination is light in weight and small in size, so as to be highly portable and easily used in situations where there is a space problem due to the presence of other nearby structure. Still further objects will become apparent from the description of the invention which follows hereafter.

SUMMARY OF THE INVENTION

These objects and advantages are realized by a means and technique of my invention wherein a nuclear radiation source is enclosed in a recording device which is adapted to shield the source against the escape of radiation therefrom, but which has a recess in the exterior thereof across which the radiation can travel in a path confined within the device. The body to be examined is inserted into the recess so that a portion of the same is exposed to the radiation thereacross. Meanwhile, a section of recording film which is sensitive to the radiation is arranged in the recess on the opposite side of the body from the source to record the character of the portion thereon. Thereafter the body, the source and the film are shifted in relation to one another so as to expose a different portion of the body to the path of radiation while another section of the film is arranged in the recess on the opposite side of the body from the source. Moreover, radiation shielding is interposed in the path of radiation between the source and the recess during the shifting process so that the character of each portion of the body is separately recorded on a different section of the film.

In the presently preferred embodiments of the invention, the recording device is in two, individually-shielded parts which can be mated to one another to form a recess therebetween, and the body is inserted in the recess by mating the parts thereabout. For example, in the case of a fixed elongated body such as a pipe or tube assembly, the parts may be closed about the body from opposite sides thereof, and interconnected with one another so as to be supported by the body, the recess being in the form of a bore through the device which accommodates a joint or other part of the body to be examined. One part of the device has an aperture in the radiation shielding thereof which opens into the bore, and the source is inserted in this one part and reciprocated into and out of registry with the aperture during the recording process. The other part has a pair of slots in the radiation shielding thereof which open into the bore at points that are spaced apart from one another opposite the aperture in the one part, and the film is inserted in this other part and advanced section by section through and across the space between the slots. Between recordings, while the source is out of registry with

2 the aperture, and while the film is being advanced to another section, the device is rotated about the body to expose a different portion of the joint or other part of the body under examination. Preferably, the latter step is conducted by rotating a wheel on the device which engages a traction surface on the body so as to cause the device to rotate about the periphery of the body as the wheel tracks over the surface. The rotation of the wheel may also be used to cause the film to advance, as for example, where the film is carried on a spooling device which is connected to the wheel so as to turn therewith.

The nuclear radiation source may be mounted on a shuttle which is reciprocably guided in the one part of the recorder, and spring-biased into a normal position in which the source is out of registry with the aperture. The shuttle may be operated by a solenoid connected therewith, which, when energized, causes the shuttle to reciprocate against the bias thereon into a position in which the source is registered with the aperture.

Preferably, the recording device is employed in conjunction with a tread-forming device that is clamped to the body to form the traction surface thereon. Where the body is inclined to the horizontal, the recording device is normally interconnected above the tread forming device so that the latter device also serves to support the recording device on the body.

BRIEF DESCRIPTION OF THE DRAWINGS

These features will be better understood by reference to the accompanying drawings which illustrate one embodiment of a remotely-operated, motor-driven recorder of the foregoing type, as the recorder is applied in use to a welded tube assembly for purposes of examining one or more weld joints therein.

In the drawings.

Figure 5:
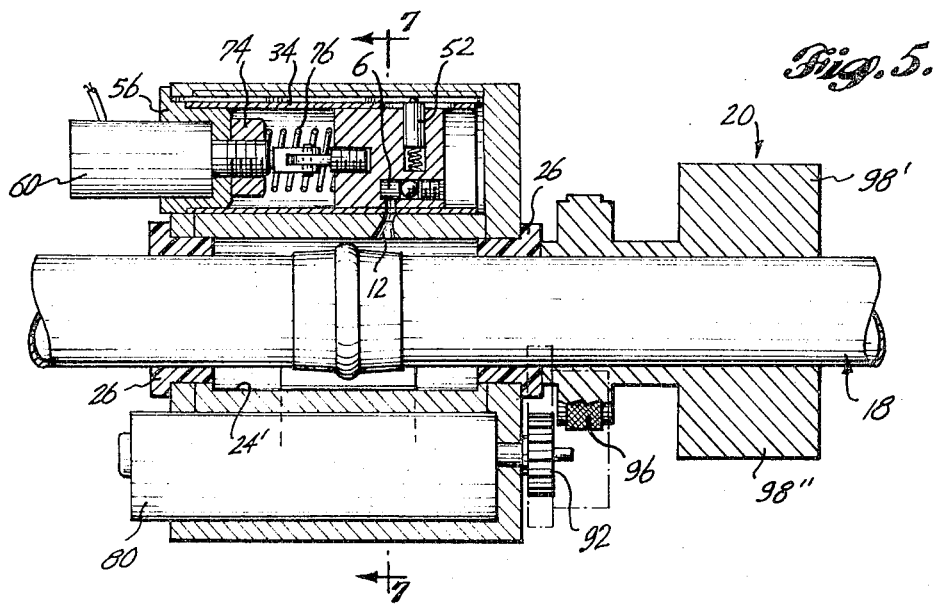
FIG. 5 is a part cross-sectional view of the recorder along the longitudinal axis of the tube assembly in FIGS. 2 and 3.

DETAILED DESCRIPTION OF THE PREFERRED EMBODIMENT:

Referring to the drawings, it will be seen that the operating components of the recorder are housed within a part-hollow, cube-like casing 2 which is constructed in two equal parts 2' and 2'' that are joined together by a piano hinge 4 so that they can be swung into and out of face-to-face registry with one another. One part 2' serves as a carrier for a radioisotope source 6, and the other part 2'' serves as a carrier for a strip of recording film 8 which is sensitive to the radiation from the source 6. Both parts are lined with lead shielding 10 which is disposed in part 2' so as to shield the source 6 against the escape of radiation into the ambient surroundings, and in part 2'' so as to shield the film 8 from exposure to the source other than when radiographic recordings are made with the recorder. During such occasions, the source is exposed to the film, and vice versa, through an aperture 12 in the lead shielding of part 2'. See FIG. 5. Otherwise, the source 6 is shifted to a position in which it is out of registry with the aperture 12, and the film is shielded from it by the lead shielding 10 in the parts. Even when the source 6 is in registry with the aperture 12, however, only a section of the film is exposed at a time, since the film appears opposite the aperture 12 only in the gap between a pair of spaced parallel slots 14 in the shielding of part 2''. Also, the film 8 is mounted on a rotatable spooling mechanism 16 (FIG. 7) within part 2'', so that the film can be advanced from one section to the next between exposures. The spooling mechanism 16 is cooperatively engaged, in turn, with the tube assembly 18 through the tread-forming device 20, so that the rotation of the mechanism 16 for purposes of advancing the film also operates to rotate or advance the recorder about the tube assembly, such that each exposure on each new section of film produces a recording of a different angular segment of the joint 22 under examination.

Dealing now with specific structural details of the recorder, it will be seen that the abutting or mating faces of the parts have opposing, complementally dimensioned, half cylindrical grooves 24 therein, which together form an axial bore 24' (FIG. 5) through the body of the recorder when the parts are registered with one another. The bore 24' is slightly oversized in diameter with respect to the joint 22 to be examined, and when the recorder is put to use, the joint is centered within the bore and a pair of flanged, split Teflon bushing 26 are interposed between the recorder and the tubing of the assembly at each end of the bore 24', to act as journal bearings for the recorder on the assembly. Thus, the recorder is free to rotate on the assembly, notwithstanding that the parts 2' and 2'' are tightly closed against one another and fastened in this condition by means of a conventional toggle or suitcase fastener 28a and 28b which is furnished with the parts on the opposite side of the casing from the hinge 4.

The aperture 12 in part 2' in fact opens into the bottom of the half cylindrical groove 24 in the face thereof, at a point slightly offset from the center of the groove, so that the aperture surveys a sizable angular portion of the joint when the recorder is fastened thereabout. It is also canted from the normal, and counterbored from the face of the part, to maximize the area of coverage. Inside of the part, the aperture opens into a cylindrical cavity 30 which is formed in the shielding at one axial end of the recorder. The cavity 30 opens to the outside through the casing and serves as a chamber within which a solenoid-operated shutter mechanism 32 is inserted and secured to provide a mounting for the source whereby it can be shifted into and out of registry with the aperture 12. The mechanism 32 is housed in an elongated sleeve 34 which press fits with the cavity 30 and has a longitudinally extending slot 36 in the upper side thereof, as well as an aperture 38 in the bottom side thereof which is disposed to register with the aperture 12 in the shielding when the mechanism 32 is inserted in the cavity 30. Within the sleeve 34, there is a cylindrical shuttle 40 of lead which is slidably engaged in the rear end portion of the sleeve 34 to carry the radioisotope source 6 as illustrated. The source is of cylindrical form and is inserted in the forward end of a cylindrical bore 42 which is removed from the rear end of the shuttle 40 at an eccentric location adjacent the lower side of the shuttle. It is retained in this dispositon by a lead shot 44 which is retained in turn by a set screw 46 that is threadedly engaged into the rear end portion of the bore 42. An aperture 48 in the underside of the shuttle opposite the location of the source, is adapted to expose the source to the apertures 38, 12 in the sleeve and the shielding when the source is in registry with them.

The shuttle 40 also serves as a means for locating the shutter mechanism in the cavity 30 in a rotational sense, in that along the upper side of the cavity there is a narrow groove 50 which is coextensive with the cavity, and the shuttle is equipped with a spring-loaded, button-headed detent 52 that is engageable with this groove. The detent 52 is housed in a transverse bore 54 in the upper side of the shuttle, and is biased outwardly through the slot 36 in the sleeve into the groove 50 of the cavity. When the shutter mechanism 32 is press fitted into the cavity 30, the detent 52 is aligned with the groove 50 to run the length of the same during the insertion process.

The shutter mechanism 32 is otherwise located in the cavity 30 by a cup-shaped cap 56 which is brazed onto the forward end of the sleeve 34, and provided with a flange 58 that abuts the casing of part 2' to form a stop for the insertion process. The cap 56 also serves as a mounting base for the solenoid 60 which is press fitted into the recess of the cap, and equipped with a threaded nipple 62 that is long enough to project into the sleeve 34 through an axial opening in the bottom of the cap. The plunger 64 of the solenoid projects through and beyond the nipple 62, and is equipped at its free end with a clevis yoke 66 to which a clevis rod 68 is pinned, the rod in turn having an enlarged head 70 which is threadedly engaged with an axial bore 72 in the forward end of the shuttle, so as to interconnect the plunger of the solenoid with the shuttle.

The threaded-on clevis connection between the plunger and the shuttle makes it possible to achieve precise registry of the aperture in the shuttle with that in the sleeve. When all is in order and before the sleeve is brazed onto the cap, a hexagonal nut 74 is threaded onto the nipple 62 against the rear end of the cap to secure all parts of the mechanism.

Figure 6:
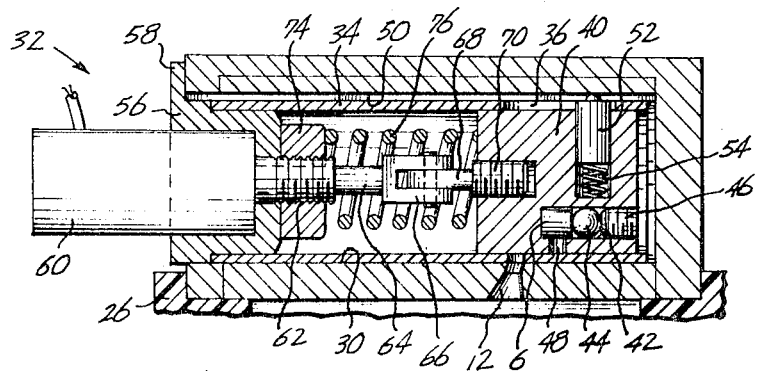
FIG. 6 is a part cross-sectional view of a solenoid operated shutter mechanism with which the exposures are made in the recorder.

In the normal inoperative condition of the mechanism, the shuttle 40 is biased into a position at the rear end of slot 36 by a coil spring 76 interposed between the nut 74 and the shuttle. On the other hand, when the solenoid is operated, the shuttle is urged into a more forward position against the bias of the spring 76 so as to register the source with the apertures in the sleeve and the shield. Compare FIGS. 6 and 5.

Figure 7:
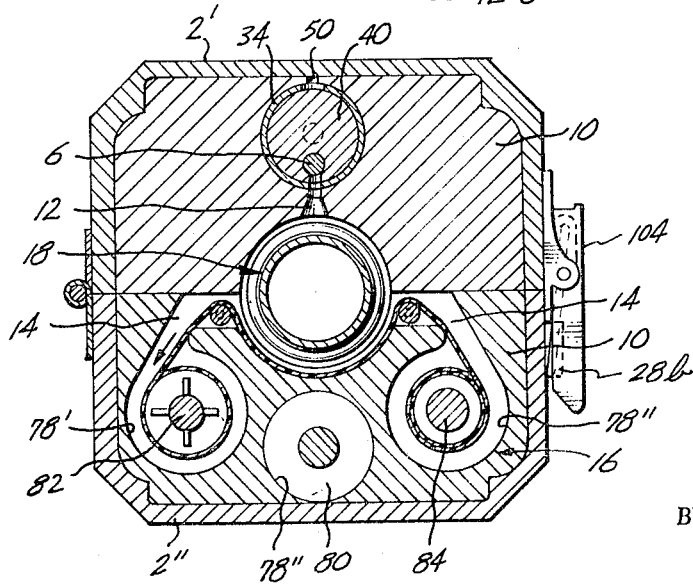
FIG. 7 is a cross-sectional view along the lines 7—7 of FIG. 5.

Turning now to part 2'' of the casing, it will be seen from FIG. 7 in particular that the shielding of this part has three cylindrical, spaced parallel cavities 78', 78'' and 78''' removed therefrom, the intermediate of which 78'' is disposed below the bore 24' between the parts, and is opened to the outside through the forward end of the casing to receive a gear motor 80 which is press fitted and secured therein. The remaining cavities 78' and 78''' are symmetrically angularly offset from the intermediate cavity, and opened into the face of part 2'' through the slots 14 in the same, which are oppositely tangentially inclined to the cavities 78' and 78''' along lines which intersect one another at an imaginary point above the bore 24'. The film 8 is stored on a storage reel 82 in one cavity, and threaded up through the adjacent slot, then across the bore, and finally downwardly through the other slot onto a takeup reel 84 in the other cavity. The threading operation, and the subsequent advancing operation of the film, are assisted by a pair of pin rollers 86 which are interposed between the slots 14 and the groove 24 of part 2'', in crenels 88 below the face of the part.

The takeup reel 84 is driven by the gear motor 80 through a pair of spur gears 90 and 92 which are interengaged with one another at the rear end of the casing. The casing of part 2'' is in two sections, one of which 2''a contains the shielding and is open-ended to the rear so that the cavities 78 and slots 14 for the film can be reached from there. The other 2''b takes the form of a plate which is screw-fastened onto the open-ended section 2''a so as to close the cavities and slots to the rear. The plate 2''b also has the storage and take-up reels 82 and 84 rotatably mounted thereon so that the reels "bayonet" into and out of the cavities when the plate is attached and removed. The spur gear 90 for the take-up reel is secured to the shaft of the same, on the outside of the plate. The spur gear 92 for the motor is rotatably journalled on the plate, and engages with and disengages from the shaft of the motor when the plate is attached to and removed from the recorder.

Figure 1:
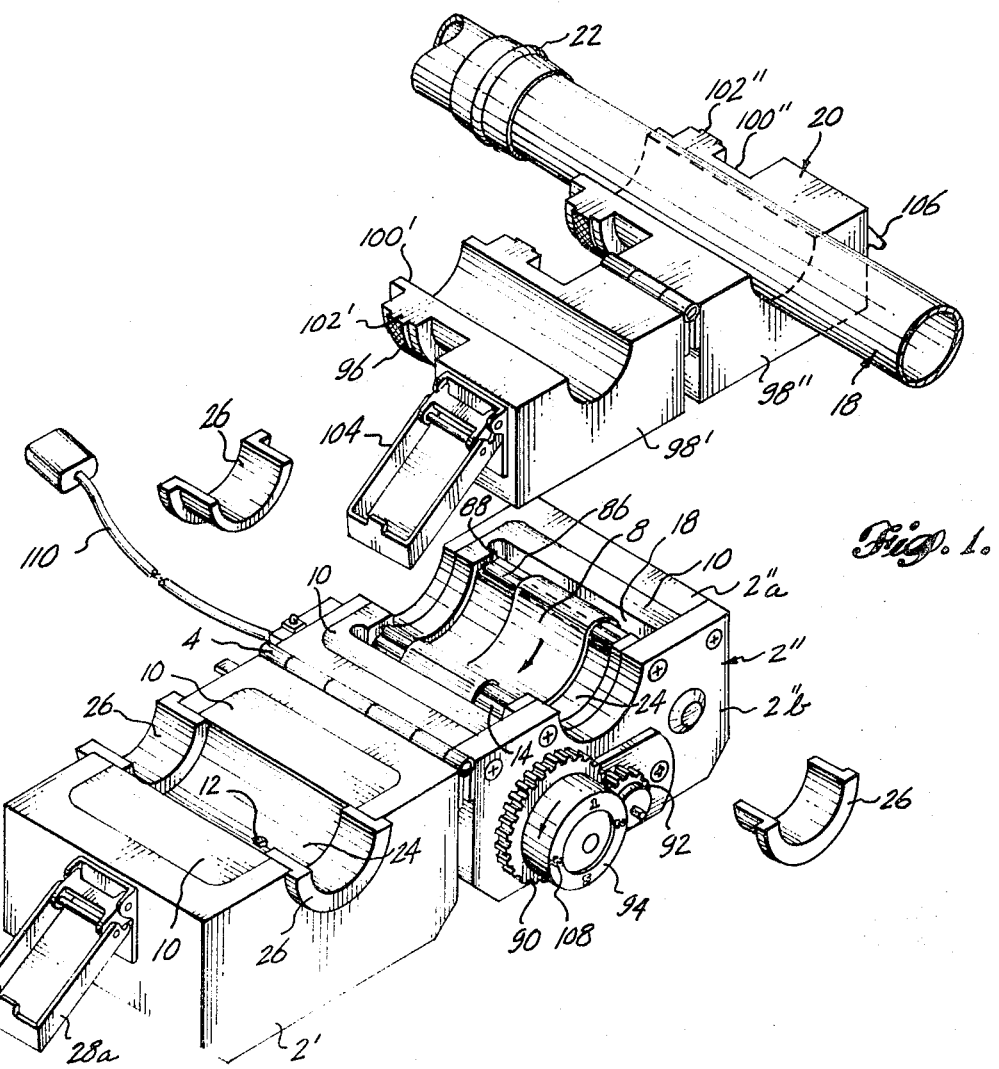
FIG. 1 is a partly exploded perspective view of the recorder as it appears in opened condition, set apart from the assembly, and together with an associated treadforming device that in use, is clamped to the assembly to form a circumferential traction surface adjacent the joint.
Figure 2:
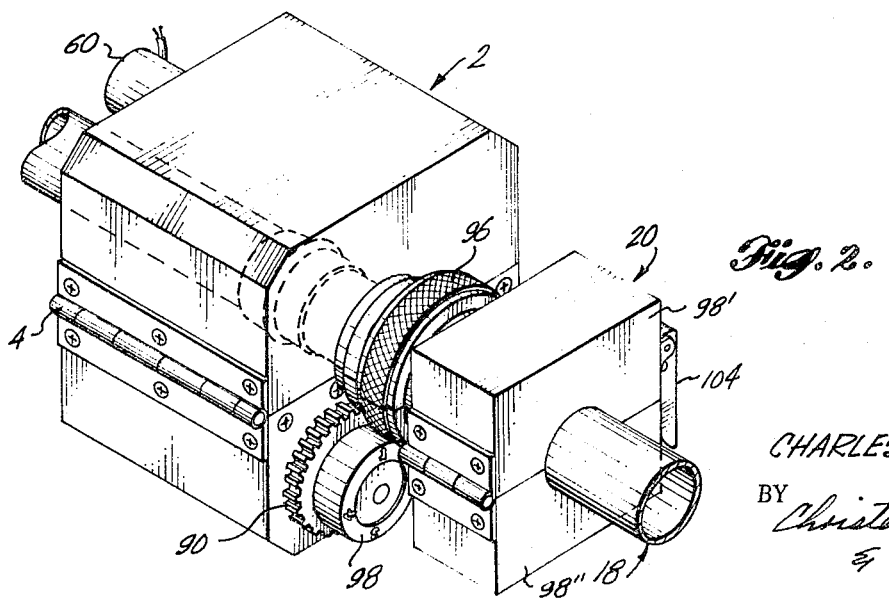
FIG. 2 is a part perspective view of the recorder and the tread-forming device as they are seen in the closed condition about the assembly, and in cooperative relationship with one another.
Figure 3:
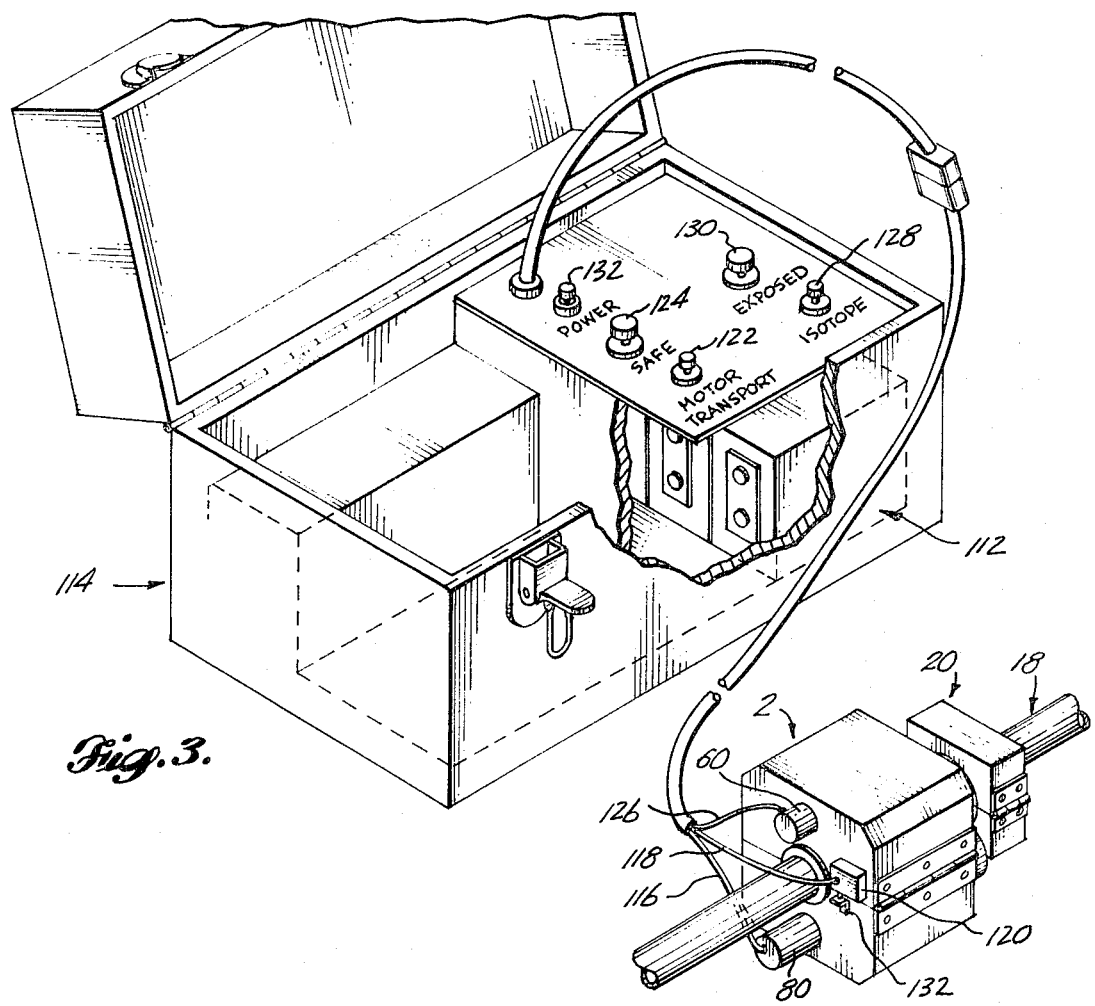
FIG. 3 is a similar but oppositely directed view of the recorder and the device, together with a container for storing the same which is equipped with a power pack for actuating the electrically-driven operating components of the recorder.

Rotation of the recorder is effected through a wheel 94 which is rigidly outstanding on the gear 90 of the takeup reel 82, to cooperate with a circumferential traction surface 96 which is formed on the tread forming device 20. As seen in FIGS. 1–3, the tread forming device 20 is essentially a pair of correspondingly grooved, orthoganally shaped blocks 98' and 98'' which are hinged to one another and have mating half cylindrical extensions 100' and 100" thereon. The extensions are provided with greatly enlarged part circumferential ribs 102' and 102" that are knurled or otherwise roughened to form the traction surface 96 when the blocks are clamped and fastened about the tube assembly 18 by a suitcase latch 104, 106 thereon. In use, the tread-forming device 20 is clamped to the assembly at a point at which the wheel 94 can ride over the traction surface 96 when the recorder is engaged about the joint 22 in the manner indicated. The device also provides a vertical support for the recorder when the tube assembly is disposed in other than a horizontal plane.

Numerals 108 on the wheel 94 enable the operator to correlate the varying angular positions of the recorder with the fixed position of the tread-forming device. Thus, by observing the numerals and each change in their relationship with the tread-forming device, he can stop the recorder to focus aperture 12 on the assembly at 90° intervals, or at any other angular interval about the assembly he chooses.

The gear motor 80 and the solenoid 60 are individually selectively operable from the power pack 112 of the storage container 114. The power pack is connected with the motor and solenoid through a plug-interconnected two-piece cord 110 containing a plurality of separate leads, one of which 116 extends to the motor, and another of which 118 extends to a switch 120 on the part 2" of the casing. The switch is closed by a tab on part 2' of the casing, so that when the casing is closed, the switch interconnects the solenoid with the pack through a third lead 126.

Figure 4:
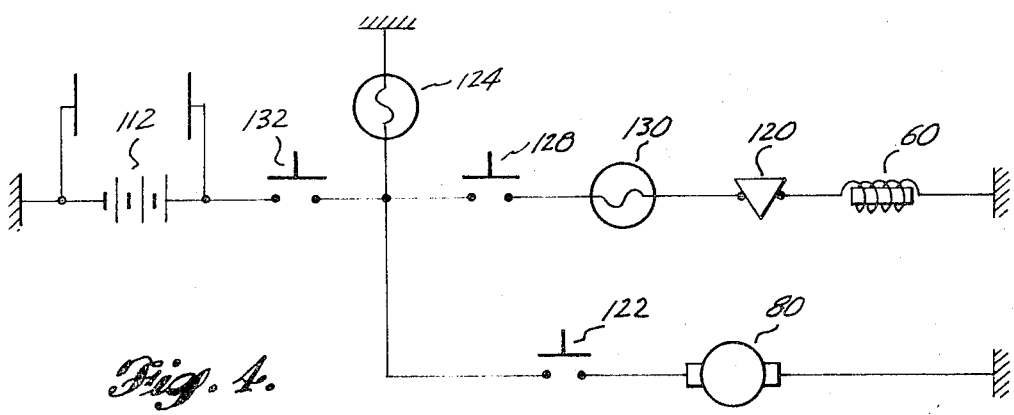
FIG. 4 is a diagrammatic view of the electrical system for these components.

Each connection to the motor and the solenoid is separately controlled on the container, there being a push-button switch 122 for the motor, and another such switch 128 for the solenoid. The switches 122 and 128 are in series with a third switch 132 which also must be depressed to connect the pack with the motor or solenoid. Thus, during an exposure, switches 132 and 128 are depressed, whereas during a change of location about the joint, switches 132 and 122 are depressed. A light 124 indicates the electrical system is operative when switch 132 is depressed. Another light 130 indicates an exposure is in progress. The schematic diagram in FIG. 4 illustrates the system.

What is claimed is:

1. Apparatus for making a radiographic examination of a body, comprising a recording device for enclosing a nuclear radiation source, which is adapted to shield the source against the escape of radiation therefrom, but which has a recess in the exterior thereof across which the radiation can travel in a path confined within the device, the recess being adapted to receive the body therein so that a portion of the same is exposed to the radiation thereacross, means for arranging a section of a recording film which is sensitive to the radiation in the recess on the opposite side of the body from the source to record the character of the portion thereon, means for shifting the body, the source, and the film in relation to one another so as to expose a different portion of the body to the path of radiation while another section of the film is arranged in the recess on the opposite side of the body from the source, and means for interposing radiation shielding in the path of radiation between the source and the recess during the shifting process, so that the character of each portion of the body is separately recorded on a different section of the film, the recording device being in two, individually-shielded parts which are mated to one another to form the recess therebetween, and the body being inserted in the recess by mating the parts thereabout, one part of which has an aperture in the radiation shielding thereof which opens into the recess, and the source being inserted in this one part and reciprocated into and out of registry with the aperture during the recording process, the other part having a pair of slots in the radiation shielding thereof which open into the recess at points that are spaced apart from one another opposite the aperture in the one part, and the film being inserted in this other part and advanced section by section through and across the space between the slots, and the means for shifting the body, the source, and the film in relation to one another including means which are operative to rotate the device about the body while the source is out of registry with the aperture and the film is being advanced another section.

2. The apparatus according to claim 1 wherein the parts are adapted to be closed about the body from opposite sides thereof, and interconnected with one another so as to be supported by the body, the recess being in the form of a bore through the device which accommodates the part of the body to be examined.

3. The apparatus according to claim 1 wherein the rotation means include a wheel on the device which engages a traction surface on the body so as to cause the device to rotate about the periphery of the same as the wheel tracks over the surface.

4. The apparatus according to claim 3 wherein the means for shifting the body, the source, and the film in relation to one another also include a spooling device which has the film carried thereon and which is connected to the wheel so as to turn therewith.

5. The apparatus according to claim 3 further comprising a tread-forming device which is adapted to be clamped to the body to form the traction surface thereon.

6. The apparatus according to claim 1 wherein the nuclear radiation source is mounted on a reciprocably-guided shuttle which is spring biased into a normal position in which the source is out of registry with the aperture, there being a solenoid connected with the shuttle which, when energized, causes the shuttle to reciprocate against the bias thereon into a position in which the source is registered with the aperture.

* * * * *